June 10, 1958 W. F. BROWN, JR., ET AL 2,837,915
AXIAL LOADING CREEP AND RUPTURE MACHINE
Filed Dec. 20, 1954 2 Sheets-Sheet 1

INVENTORS
WILLIAM F. BROWN, JR.
MELVIN H. JONES

BY
*R. J. Tompkins*
ATTORNEYS

June 10, 1958   W. F. BROWN, JR., ET AL   2,837,915
AXIAL LOADING CREEP AND RUPTURE MACHINE
Filed Dec. 20, 1954   2 Sheets-Sheet 2
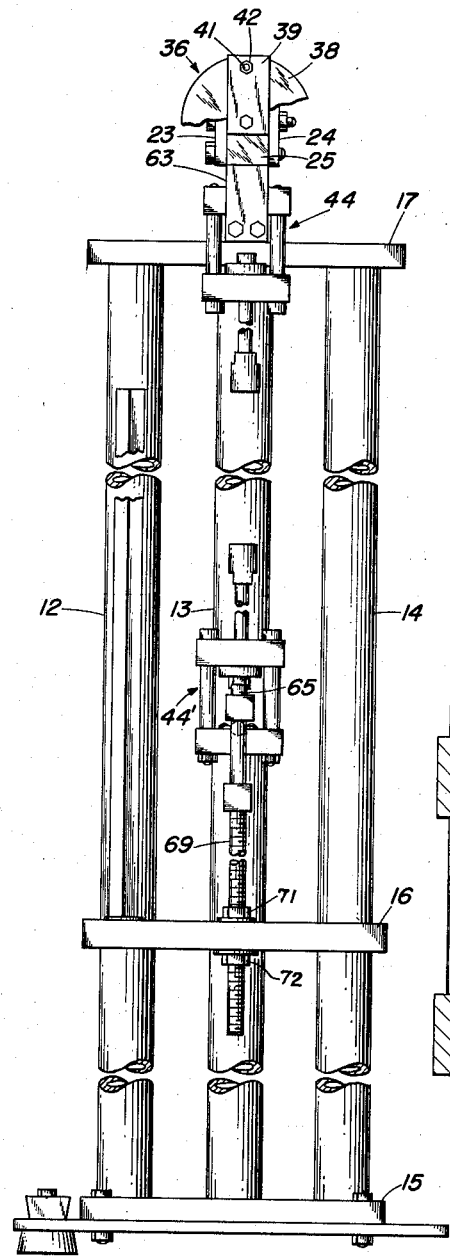
FIG. 2
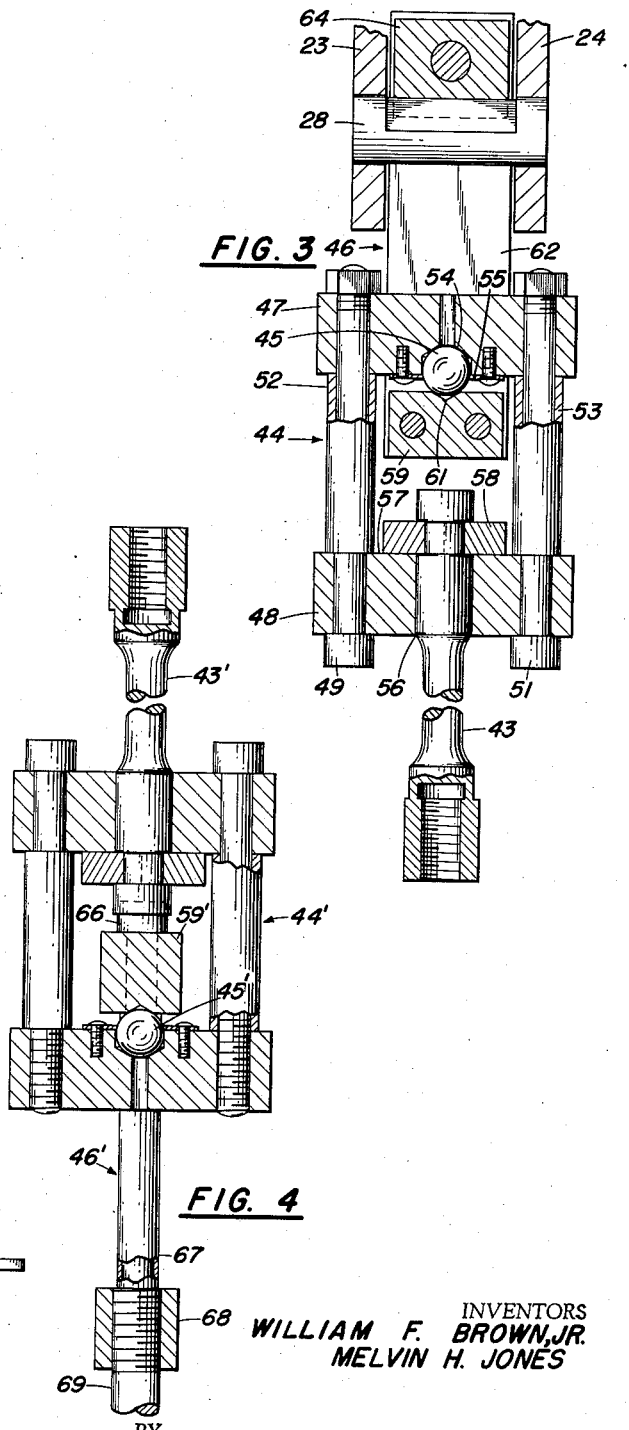
FIG. 3
FIG. 4
INVENTORS
WILLIAM F. BROWN, JR.
MELVIN H. JONES
BY
R. J. Tompkins
ATTORNEYS

United States Patent Office 2,837,915
Patented June 10, 1958

2,837,915

AXIAL LOADING CREEP AND RUPTURE MACHINE

William F. Brown, Jr., Bay Village, and Melvin H. Jones, Olmsted Falls, Ohio

Application December 20, 1954, Serial No. 476,612

7 Claims. (Cl. 73—95)

(Granted under Title 35, U. S. Code (1952), sec. 266)

The invention described herein may be manufactured and used by or for the Government of the United States of America for governmental purposes without the payment of any royalties thereon or therefor.

The present invention relates to an axial loading creep and rupture machine of the type wherein the test specimen is loaded by weights acting through a lever, and more particularly to such a creep and rupture machine which is easily and rapidly assembled and in which eccentricity of loading is held to a minimum.

In previously available testing machines each part has been separately machined and fitted into place to ensure accurate alignment and positioning of the lever so as to prevent any accidental change in the lever ratio. Furthermore, no provision has been made to ensure accurate alignment of the specimen axis with the loading axis. The present invention overcomes these disadvantages of the previous machines by provision of a testing machine, in which: the frame is self-jigging for accurate and rapid erection; the lever ratio can be adjusted at assembly; means are provided for preventing eccentricity of loading.

An object of the present invention is the provision of an axial loading creep and rupture machine in which the axis of the test specimen is accurately aligned with the loading axis.

Another object is the provision of an axial loading creep and rupture machine in which the lever-ratio is adjustable at assembly.

Another object is the provision of an axial loading creep and rupture machine having a frame of minimum weight and maximum rigidity, and which is easily and accurately assembled.

An additional object is to provide an axial loading creep and rupture machine in which the friction between the frame and the lever is reduced to a minimum.

Other objects and many of the attendant advantages of this invention will be readily appreciated as the same becomes better understood by reference to the following detailed description when considered in connection with the accompanying drawings wherein:

Fig. 2 is a front elevation view of the machine of Fig. 1;

Fig. 3 shows a sectional view at an enlarged scale of the lower loading fixture of Fig. 2.

Figure 1:
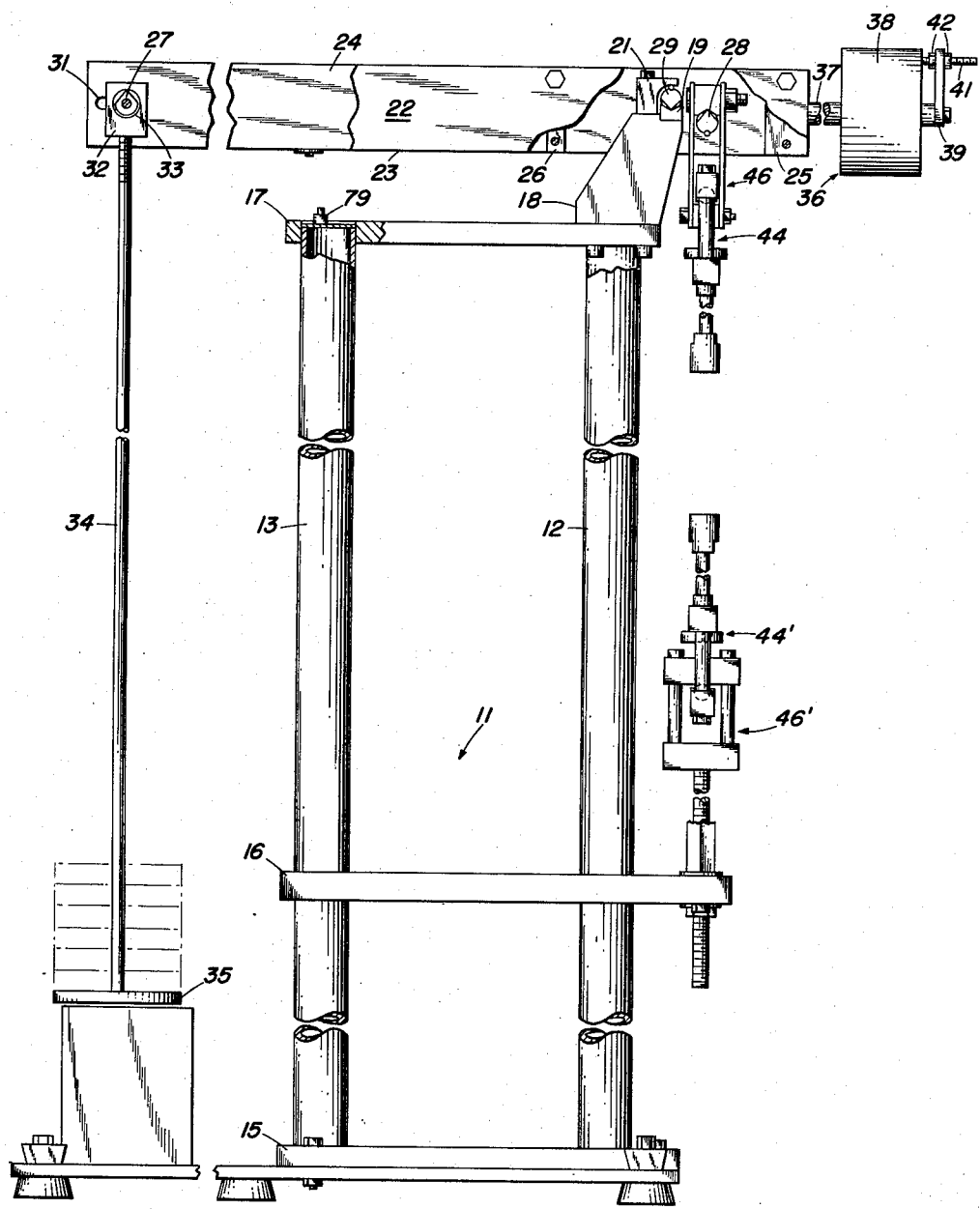
Fig. 1 is a side elevation view, partly in section, of an axial loading creep and rupture machine according to the present invention.

Fig. 4 shows a sectional view at an enlarged scale of the lower loading fixture of Fig. 2; and Referring more particularly to the drawings, there is shown in Figs. 1 and 2 an axial loading creep and rupture machine 11 including a frame formed of tubular posts 12, 13 and 14 and superposed cross plate members 15, 16 and 17. The posts are passed through aligned holes in the cross plate members and are welded or otherwise secured thereto, as shown in Figs. 1 and 2, with cross plate 15 at the lower extremity of the posts; cross plate 17 at the upper extremity; and cross plate 16 positioned between the other cross plates below the midpoint of the posts. A lever-supporting bracket 18 is secured to the upper surface of cross plate 17 between posts 12 and 14. The supporting bracket 18 includes a knife edge seat 19 and a retaining clamp 21 on its upper edge.

The lever 22 consists of two side plates 23 and 24 joined by two spacer blocks 25 and 26 and a knife edge spacer pin 27. A pair of knife edge pins 28 and 29 extend across the space between the side plates and are supported at their opposite ends by the side plates, as shown in Fig. 3. The knife edge of pin 28 is directed upwardly and supports the upper axial loading fixture. The knife edge of pin 29 is directed downwardly and bears against seat 19, providing a fulcrum about which the lever pivots. Retaining clamp 21 ensures constant contact between the knife edge of pin 29 and seat 19 and retains the lever in position on the supporting bracket. The opposite ends of spacer pin 27 are received in longitudinal slots 31 in the side plates to permit selective positioning of the pin 27 with respect to pin 29. A block 32, having a transverse bore 33, is carried by pin 27 between the side plates with the upwardly directed knife edge of the pin bearing against the upper edge of the bore. The upper end of an elongated rod 34 is threadedly engaged with the lower surface of block 32 while the lower end of the rod is secured to the weight pan 35. A counterweight assembly 36, which balances the tare weight of the lever, rod and weight pan, is attached to the end of the lever removed from the pin 27. A cantilever support rod 37 is secured to the forward face of spacer block 25 and extends outwardly therefrom. A counterweight 38 is mounted on the rod 37 for sliding movement towards or away from the spacer block 25. An arm 39 is attached to the free end of rod 37 and extends radially therefrom. An externally threaded stud 41 is attached to the forward face of the counterweight and extends outwardly therefrom and through an opening in the arm 39. When the counterweight 38 is properly located on rod 37 to balance the tare weight of the lever, rod and weight pan, it is maintained in position by means of lock nuts 42 which clamp the stud 41 to arm 39.

Referring to Figs. 3 and 4, the upper and lower axial loading fixtures are each provided with the same essential features, i. e.; a button head loading rod 43, 43′; a precision machined yoke 44, 44′; a fixed ball bearing 45, 45′; and a ball loading yoke 46, 46′. Since these features are the same for both fixtures, the detailed description of Fig. 3 will apply equally to Fig. 4. Referring to Fig. 3, the yoke 44 comprises two rectangular cross members 47 and 48 which are positioned accurately with respect to each other by precision ground studs 49 and 51 and spacing sleeves 52 and 53. A recess 54 is machined in the inner surface of cross member 47 and the ball bearing 45 seated therein with a maximum clearance of 0.0005 inch. The ball 45 is prevented from bouncing when the specimen breaks and thereby wearing its seat in the recess, by means of the retaining washer 55. The cross member 48 is provided with a loading rod bore 56, the center of which coincides with the ball bearing center within 0.0005 inch. The loading surface 57 of cross member 48 is machined flat and is perpendicular to the axis of the loading rod bore. The button head loading rod 43 is positioned in bore 56 with a maximum clearance of 0.0005 inch and is retained in place by split collar 58. The loading faces of the loading rod and the split collar are machined flat and parallel to each other within 0.0005 inch. The end of the loading rod which attaches to the test specimen may be internally threaded (as shown) to receive a threaded specimen or it may be provided with split adapters to receive a button head specimen. In either case, the same precision is required in machining this end of the rod as in machining the remainder of the fixture. The ball loading yoke 46 transmits force to the ball bearing and the ball loading bar 59 is provided with a shallow seat 61 which the ball contacts, thereby reducing friction to a minimum. The yoke 46 includes the ball loading bar 59, two supporting plates 62 and 63, and knife edge seat 64 which rides on knife edge pin 28. As shown in Fig. 4, the ball loading yoke 46' includes ball loading bar 59', studs 65 and 66, spacing sleeves 67, and cross bar 68. An externally threaded rod 69 is attached at one end to bar 68 and is passed through an opening in cross plate 16. The rod 69 is clamped to the cross plate by means of nuts 71 and 72 to anchor the lower loading fixture.

The use of tubular posts and cross plate members permits the plate members to be gang machined to receive the posts, and all other holes can be located with respect to these gang machined holes. This design permits accurate location of the lever with respect to the attachment point of the lower loading fixture by referencing the post holes. In addition, the main frame components are self-jigging for assembly by welding.

The accurate location of the lever with respect to the attachment point for the lower loading fixture ensures best possible alignment of the tensile load with respect to the specimen axis if a loading device other than that shown in Figs. 3 and 4 is employed. In addition, the construction of the lever permits the use of two knife edges (28 and 29) instead of the usual four and protects them from accidental damage by enclosing them within the lever. Furthermore, the machining of the lever components need not be precise since the lever ratio may be adjusted at assembly to the proper figure by positioning pin 27 in slots 31.

The upper and lower loading fixtures of Figs. 3 and 4 ensure that the axis of tensile loading coincides with the specimen axis. Displacement of these axes causes a bending stress, which increases in proportion to the displacement, to be superimposed on the tensile stress applied by the creep machine lever. Axiality of loading is extremely important when testing materials of low ductility, since the strength of such specimens is very sensitive to the superimposed bending stress and therefore will vary with the bending stress giving rise to a large scatter of the test results. In this regard, it is obvious that in the loading fixtures of Figs. 3 and 4, the axis of the load may be displaced from the ball center. However, the loading axis in respect to the specimen is determined by the ball center and will pass through the axis of an accurately machined specimen within very close limits.

Obviously, many modifications and variations of the present invention are possible in the light of the above teachings. It is therefore to be understood, that within the scope of the appended claims, the invention may be practiced otherwise than as specifically described.

What is claimed is:

1. An axial loading creep and rupture machine comprising: at least three tubular post members; at least three superposed cross plates, said plates having at least three sets of aligned openings therein, each of said posts being received in one of said sets of openings and secured to said cross plates; a supporting bracket secured to the uppermost of said cross plates; a lever having two oppositely directed knife edges therein, said lever being supported on said bracket by means of one of said knife edges; loading means on one end of said lever remote from said knife edges; an upper loading fixture adapted to hold one end of a test specimen suspended from the other of said knife edges; a lower loading fixture adapted to hold the other end of said test specimen anchored to an intermediate cross plate; each of said fixtures including two interengaging yokes, a ball between said yokes whereby forces are transmitted from one yoke to the other through said ball, and means on said lever for adjusting the lever ratio, whereby the axis of said test specimen is accurately aligned with the loading axis to produce a minimum of bending stress.

2. For use in an axial loading creep and rupture machine, a test specimen loading fixture comprising: a precision machined yoke including two cross bars mounted in spaced parallel relation, one of said cross bars being provided with a transverse bore, the other cross bar having a recess on the side adjacent the one cross bar, the centerline of said recess coinciding with the centerline of said bore; a specimen loading rod mounted in the bore; a ball bearing positioned in the recess; and a loading yoke including a loading bar positioned between the cross bars and transversely thereof, said loading bar contacting the ball bearing.

3. An axial loading creep and rupture machine comprising: three tubular post members; three superposed cross plates, said plates having three sets of aligned openings therein, each of said posts being received in one of said sets of openings and secured to the cross plates; a supporting bracket secured to the uppermost of said cross plates; a lever positioned on said bracket; loading means supported on one end of said lever, and upper and lower loading fixtures supported by the other end of said lever and the intermediate cross plate respectively, each of said fixtures including two interengaging yokes, a ball between said yokes whereby forces are transmitted from one yoke to the other through said ball.

4. For use in an axial loading creep and rupture machine, a test specimen loading fixture comprising: a precision machined yoke including two cross bars mounted in spaced parallel relation, one of said cross bars being provided with a recess on the side adjacent the other cross bar; a ball bearing positioned in said recess; a specimen loading bar mounted on the said other cross bar, the centerline of said loading bar coinciding with the centerline of said ball bearing; and a loading yoke including a loading bar positioned between the cross bars and transversely thereof, said loading bar contacting the ball bearing.

5. An axial loading creep and rupture machine comprising a support, a supporting bracket secured to said support, a lever fulcrumed on said bracket, loading means connected to one end of said lever for supporting a load, and means supported by the other end of said lever and attached to said support for holding a test specimen in which the axis of the test specimen is accurately aligned with the loading axis, said means including at least one pair of interengaging yokes, a ball between said yokes whereby forces are transmitted from one yoke to the other through said ball.

6. The combination set forth in claim 5 wherein one of said interengaging yokes comprises two cross bars mounted in spaced parallel relation, one of said cross bars being provided with a recess on the side adjacent the other cross bar, said ball being positioned in said recess, a test specimen loading bar mounted on the said other cross bar, the extension of the centerline of said loading bar passing through the center of said ball, and the other of said yokes including a loading bar positioned between the cross bars and transversely thereof, said loading bar contacting the ball.

7. An axial loading creep and rupture machine comprising a support, a supporting bracket secured to said support, a lever fulcrumed on said bracket, loading means connected to one end of said lever for supporting a load, and upper and lower loading fixtures supported by the other end of said lever and attached to said support respectively, each of said fixtures including two interengaged yokes and a ball between said yokes, whereby forces are transmitted from one yoke to the other through said ball.

(References on following page)

References Cited in the file of this patent

UNITED STATES PATENTS

| | | |
|---|---|---|
| 919,140 | Duncan | Apr. 20, 1909 |
| 993,700 | McKnight | May 3, 1911 |
| 1,341,431 | Morrow | May 25, 1920 |
| 1,456,596 | Hugentobler | May 29, 1923 |
| 1,573,521 | Moran | Feb. 16, 1926 |
| 2,278,633 | Bagnall | Apr. 7, 1942 |
| 2,339,635 | Hall | Jan. 18, 1944 |
| 2,545,482 | Manjoine | Mar. 20, 1951 |
| 2,748,597 | Kooistra | June 5, 1956 |

FOREIGN PATENTS

| | | |
|---|---|---|
| 584,653 | Great Britain | Jan. 18, 1946 |
| 559,465 | Great Britain | Aug. 12, 1942 |